United States Patent [19]
Kodama et al.

[11] Patent Number: 5,808,606
[45] Date of Patent: Sep. 15, 1998

[54] OPTICAL COORDINATE INPUT APPARATUS

[75] Inventors: Tomoaki Kodama; Yorimi Yokoyama, both of Hadano; Kazuyoshi Hibiya, Odawara, all of Japan

[73] Assignee: Stanley Electric Co., Ltd., Tokyo, Japan

[21] Appl. No.: 864,422

[22] Filed: May 28, 1997

[30] Foreign Application Priority Data

May 31, 1996 [JP] Japan .................................. 8-139188

[51] Int. Cl.⁶ .................................................... G09G 5/00
[52] U.S. Cl. ............................................ 345/175; 345/156
[58] Field of Search .................................. 345/156, 173, 345/175, 178

[56] References Cited

U.S. PATENT DOCUMENTS

| | | | |
|---|---|---|---|
| 4,774,404 | 9/1988 | Hasegawa et al. | 345/175 |
| 4,812,830 | 3/1989 | Doering | 345/175 |
| 5,543,589 | 8/1996 | Buchana et al. | 345/175 |

*Primary Examiner*—Jeffery A. Hofsass
*Assistant Examiner*—Julie Lieu
*Attorney, Agent, or Firm*—Weingarten, Schurgin, Gagnebin & Hayes LLP

[57] ABSTRACT

In an optical coordinate input apparatus, the light emitting elements 3a and the light receiving elements 3b of a surface-mounted type constituting the photocouplers 3 are used and mounted on the substrate 2 in close contact with the substrate 2 and the photocouplers 3 arranged on the rear side 2d are displaced from the photocouplers 3 arranged on the front side 2c by half a pitch. Therefore, the lines 3c of action of the photocouplers 3 can be made close to the substrate and the resolution can be improved to twofold while there is not produced such a difference of the detection position that will cause practical inconvenience.

1 Claim, 3 Drawing Sheets

OPTICAL COORDINATE INPUT APPARATUS

BACKGROUND OF THE INVENTION

1. Field of the Invention

The present invention relates to a coordinate input apparatus used to detect a position touched by finger on a screen when input is carried out by touching the press-button screen displayed on a display such as a CRT or LED directly by finger. More specifically, it relates to an apparatus configured to detect the position optically.

2. Background Art

FIGS. 3 and 4 show examples of this type of optical coordinate input apparatus 90 of the prior art. A plurality of photocouplers 92 are arranged at a predetermined pitch on vertical sides 91a and horizontal sides 91b of a substrate 91 formed like a substantially rectangular frame to surround a screen 10a of a liquid crystal display 10 or the like.

The photocouplers 92 consist of light emitting elements 92a such as LEDs and light receiving elements 92b such as phototransistors which face each other. The lines 92c of action of the photocouplers cross each other at a right angle on the above screen 10a, whereby which position on the screen 10a is touched is detected by the positions of the photocouplers 92 on the vertical side 91a and horizontal side 91b whose output are shaded.

However, firstly, the above optical coordinate input apparatus 90 of the prior art has such a problem that it is difficult to make the pitch of the photocouplers 92 smaller than the size of the light emitting element 92a or the light receiving element 92b because adjacent elements arranged on the substrate 91 are brought into close contact with each other and hence, there is a limit to the obtained resolution.

Secondly, since the light emitting elements 92 and the light receiving elements 92b in DIP (dual in-line package) which have foot portions 93 as shown in FIG. 5 are used in the prior art and mounted afloat above the substrate 91 in many cases and there is a space between the screen 10a and the lines 92c of action, when the screen 10a is touched by finger from an oblique direction, there is easily produced a difference between a position T1 on the screen 10a and a position T2 detected by the optical coordinate input apparatus 90. Therefore, the optical coordinate input apparatus 90 of the prior art has such an accuracy problem and solutions to these problems have been awaited.

SUMMARY OF THE INVENTION

It is therefore an object of the present invention to provide as means for solving the problems of the prior art an optical coordinate input apparatus in which photocouplers consisting of light emitting elements and light receiving elements which face each other are arranged on a substrate surrounding a screen at a predetermined pitch in such a manner that their lines of action cross each other at a right angle, wherein the light emitting elements and the light receiving elements of a surface-mounted type are used, mounted on the substrate in such a manner that they are in close contact with the substrate, and arranged on both front and rear sides of the substrate in such a manner that they are separated from each other by half the pitch.

BRIEF DESCRIPTION OF THE DRAWINGS

These and other objects as well as advantages of the present invention will become clear by the following description of a preferred embodiment of the present invention with reference to the accompanying drawings, wherein.

DETAILED DESCRIPTION OF THE PREFERRED EMBODIMENTS

Figure 1:
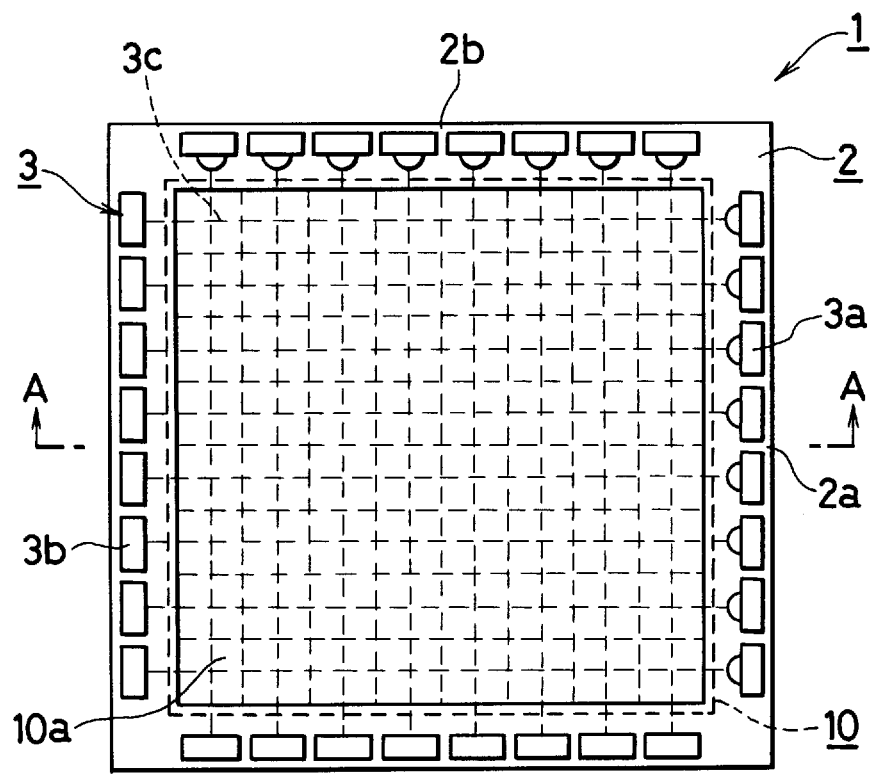
FIG. 1 is a plan view of an optical coordinate input apparatus according to an embodiment of the present invention.
Figure 2:
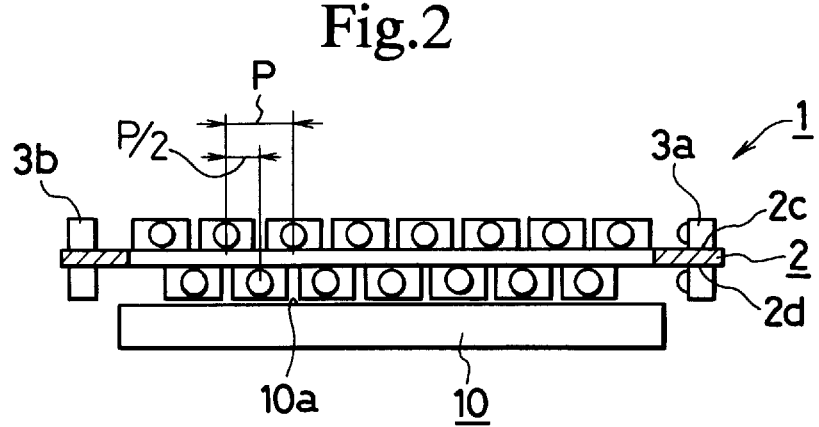
FIG. 2 is a sectional view cut on line A—A of FIG. 1.
Figure 3:
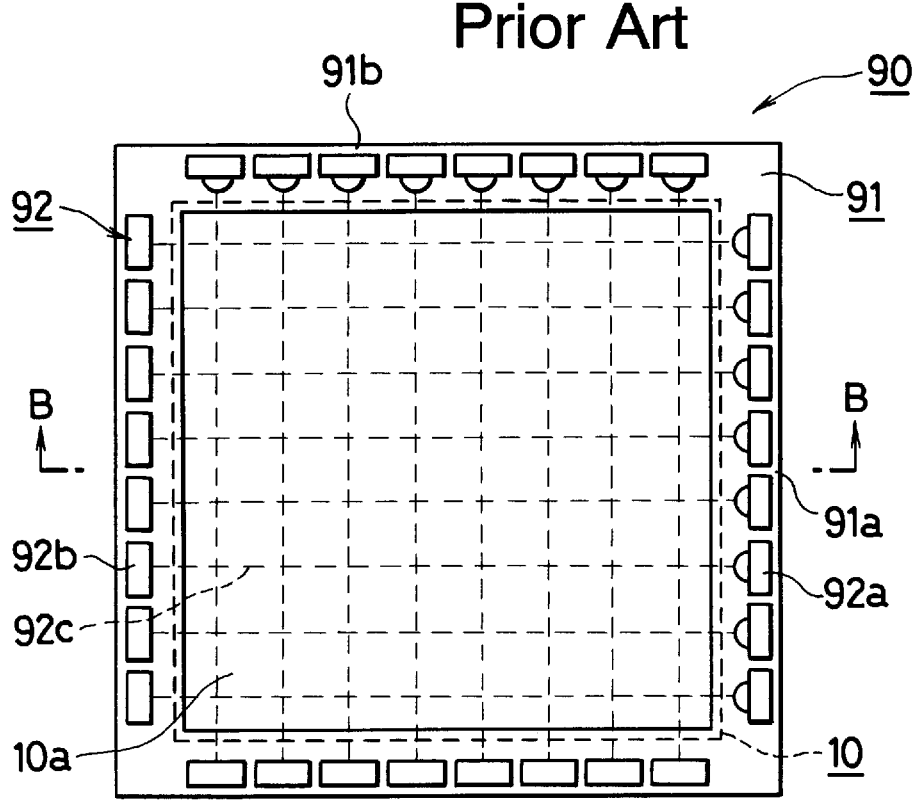
FIG. 3 is a plan view of the prior art.
Figure 4:
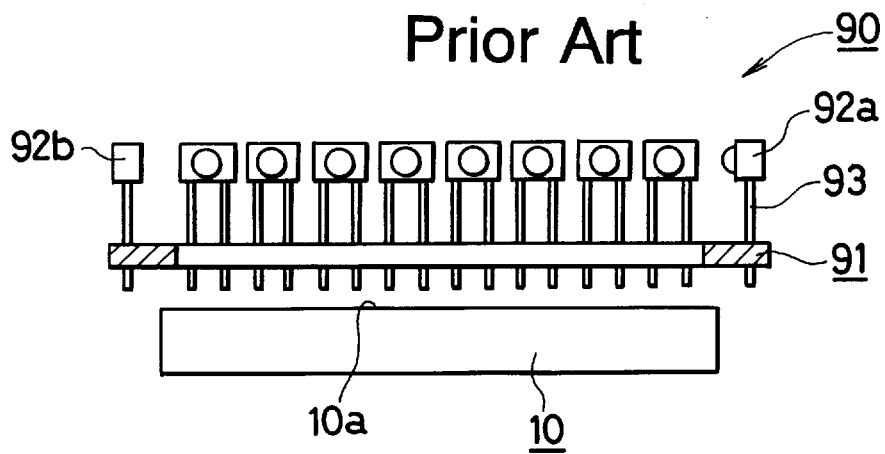
FIG. 4 is a sectional view cut on line B—B of FIG. 3.
Figure 5:
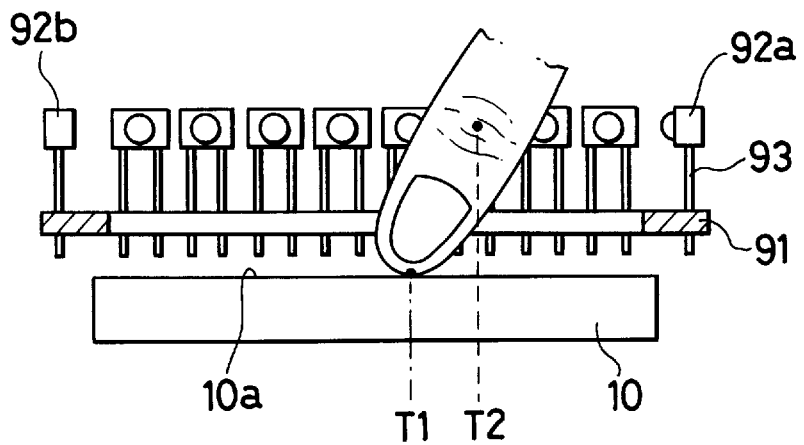
FIG. 5 is a diagram for explaining the detection state of the prior art.

The present invention is described in detail with reference to a preferred embodiment shown in the accompanying drawings. Reference numeral 1 in FIGS. 1 and 2 denotes an optical coordinate input apparatus according to the present invention which is the same as the prior art in that a plurality of photocouplers are arranged on vertical sides 2a and horizontal sides 2b of a substrate 2 formed like a substantially rectangular frame to surround a screen 10a of a liquid crystal display 10 or the like.

In the present invention, light emitting elements 3a and light receiving elements 3b constituting the photocouplers 3 are both of a surface-mounted type so called "flat package" that they are mounted in close contact with the substrate 2 and mounted on the front side 2c and the rear side 2d of the substrate 2.

The minimum size of the pitch P between the photocouplers 3 mounted on the substrate 2 is determined by the size of the light emitting element 3a or the light receiving element 3b as having been explained in the section of the related art. To improve resolution, the minimum size is set as the pitch P between the photocouplers 3 on both the front side 2c and the rear side 2d of the substrate 2.

The photocouplers 3 arranged on the rear side 2d of the substrate 2 are displaced from the photocouplers 3 arranged on the front side 2c by ½ the pitch P of the photocouplers 3 on the rear side 2d. Therefore, the lines 3c of action of the photocouplers 3 arranged on the front side 2c and the lines 3c of action of the photocouplers 3 arranged on the rear side 2d cross each other at a right angle at a pitch of ½ P.

A description is subsequently given of the function and effect of the optical coordinate input apparatus 1 of the present invention constituted above. Firstly, since the light emitting elements 3a and the light receiving elements 3a of a surface-mounted type are used, they can be mounted on the substrate 2 in close contact with the substrate 2. Therefore, when they are attached to both the front side 2c and the rear side 2d of the substrate 2, there isn't much space between their lines 3c of action.

Consequently, even when a finger touching the screen 10a is inclined, there is rarely a difference between the detection position of the photocouplers 3 arranged on the front side 2c and the detection position of the photocouplers 3 arranged on the rear side 2d. Therefore, according to the present invention, the same effect can be obtained as in the case where the photocouplers are arranged on the front side 2c (or the rear side 2d) at a pitch of ½ P, thereby improving resolution to twofold.

Since the light emitting elements 3a and the light receiving elements 3b of a surface-mounted type are used, it is possible to reduce the thickness of the entire optical coordinate input apparatus 1. In addition, since the photocouplers 3 are arranged on the rear side 2d as well, the lines 3c of action of the photocouplers on the rear side 2d can be arranged in the proximity of the screen 10a and the lines 3c of action of the photocouplers 3 on the front side 2c are not so apart from the screen 10a.

This reduces the difference between the touched position on the screen 10a and the position detected by the optical coordinate apparatus 1, whereby the effect of improving the above resolution that the touched position on the screen 10a can be detected more accurately cannot be impaired by the positional difference produced at the time of detection.

The subject matter of the present invention is to improve resolution to twofold by attaching the photocouplers 3 to both the front side 2c and the rear side 2d of the substrate 2 in such a manner that their lines 3c of action are not so apart from each other and by displacing the photocouplers 3 on the front side 2c from the photocouplers 3 on the rear side 2d by half a pitch. A light emitting element array and a light receiving element array may be used in place of the above light emitting elements and the light receiving elements of a surface-mounted type.

As described above, according to the present invention, since the optical coordinate input apparatus is configured such that the light emitting elements and the light receiving elements of a surface-mounted type are used, mounted on the substrate in close contact with the substrate and mounted on both front and rear sides of the substrate in such a manner that they are separated from one another by half a pitch, the photocouplers can be mounted on the front side and the rear side of the substrate in such a manner that their lines of action can be made close to the substrate and there is not produced such a difference of the detection position that will cause practical inconvenience as the photocouplers consist of the light emitting elements and the light receiving elements of a surface-mounted type.

Since the photocouplers on the front and rear sides are displaced from each other by half a pitch, the resolution for enabling detection, whose minimum value is determined by the size of the light emitting element or the light receiving element, can be improved up to ½ the minimum value. Thus, the present invention provides an extremely excellent effect in improving the performance of this type of optical coordinate input apparatus.

Since the photocouplers consist of light emitting elements and light receiving elements of a surface-mounted type, the entire optical coordinate input apparatus can be made thin, the lines of action of the photocouplers can be arranged in the proximity of the screen, and the difference between the contact point on the screen and the point detected by the optical coordinate input apparatus can be made small. Thus, the present invention provides an extremely excellent effect in improving the accuracy of this type of optical coordinate input apparatus.

What is claimed is:

1. An optical coordinate input apparatus in which photocouplers consisting of light emitting elements and light receiving elements which face each other are arranged on a substrate surrounding a screen at a predetermined pitch in such a manner that their lines of action cross each other at a right angle, wherein:

the light emitting elements and the light receiving elements of a surface-mounted type are used, mounted on the substrate in such a manner that they are in close contact with the substrate, and arranged on both front and rear sides of the substrate in such a manner that they are separated from each other by half the pitch.

* * * * *